United States Patent

[11] 3,628,108

[72] Inventors Herbert C. Craig
Stamford, Vt.;
Andrew E. Dequasie, North Adams, Mass.;
Raynor Linzey, Stamford, Vt.
[21] Appl. No. 39,673
[22] Filed May 20, 1970
[45] Patented Dec. 14, 1971
[73] Assignee Sprague Electric Company
North Adams, Mass.

[54] CONVOLUTELY WOUND CAPACITOR
6 Claims, 5 Drawing Figs.
[52] U.S. Cl. .................................................. 317/258,
317/260
[51] Int. Cl. .................................................. H01g 1/11
[50] Field of Search .................................... 317/260,
258

[56] References Cited
UNITED STATES PATENTS
1,870,949  8/1932  Dublier ..................... 317/260
3,531,699  8/1970  Peck ......................... 317/260 X
FOREIGN PATENTS
453,939  9/1936  Great Britain ............... 317/260

Primary Examiner—E. A. Goldberg
Attorneys—Connolly and Hutz, Vincent H. Sweeney and James Paul O'Sullivan ABSTRACT: Pairs of electrodes are convolutely wound in intimate contact with interposed dielectric spacers. The winding also includes interposed double metallized insulative strips having a margined edge. The metal coatings on each strip are interconnected such that the strip margin provides a lateral dielectric extension substantially centered in the electric field of the electrode edges.

3,628,108

CONVOLUTELY WOUND CAPACITOR

BACKGROUND OF THE INVENTION

This invention pertains to convolutely wound capacitors, and more particularly to convolutely wound metallized capacitors for AC applications.

In the prior art, unimpregnated convolutely wound capacitors are limited to use at low AC voltages due to corona at the section ends. Consequently, only impregnated units of significantly higher cost than dry capacitors are available for AC use over 250 volts.

SUMMARY OF THE INVENTION

It is an object of this invention to provide a convolutely wound AC capacitor having a high corona start voltage.

It is another object of this invention to provide a convolutely AC capacitor having the voltage stress at the margin edge of the electrode disposed within a solid dielectric.

In accordance with this invention a pair of electrodes is convolutely wound in intimate contact with interposed spacers of dielectric film material, with each of the dielectric spacers extended beyond one edge of each electrode at opposite ends of the capacitor section for providing margin areas thereat. A pair of strips of insulating material is interposed in the winding adjoining said one edge of each electrode and extending into their adjacent margin areas; each of said strips having a conductive coating on both major surfaces thereof. The conductive coatings of each strip are in electrical connection to its adjoining electrode and are extended beyond said one edge thereof into said margin area so as to impress the electrical field of each electrode across said insulative strip in said margin area.

DESCRIPTION OF THE PREFERRED EMBODIMENTS

Figure 1:
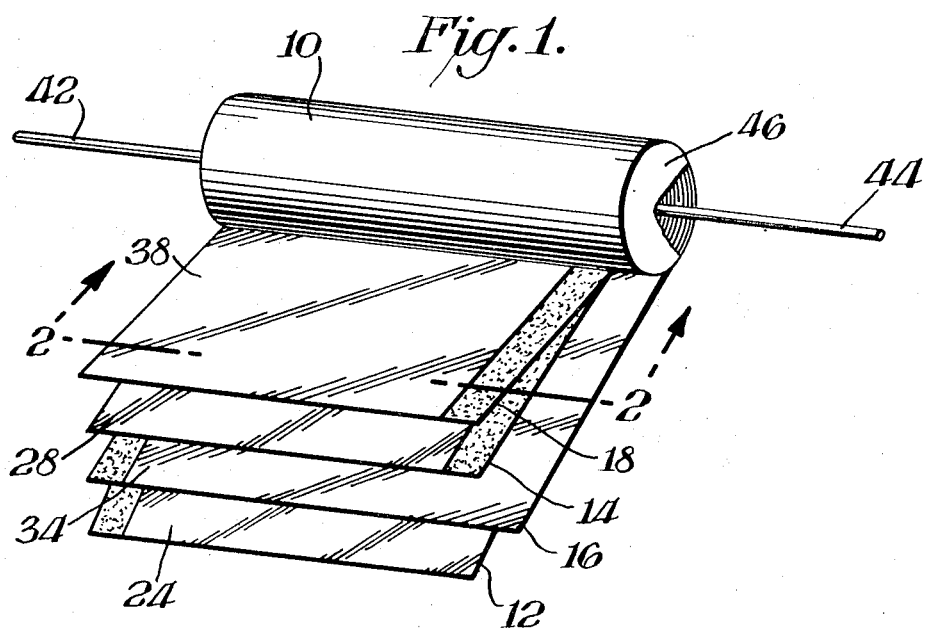
FIG. 1 is a perspective of a partially unwound capacitor provided in accordance with this invention.
Figure 2:
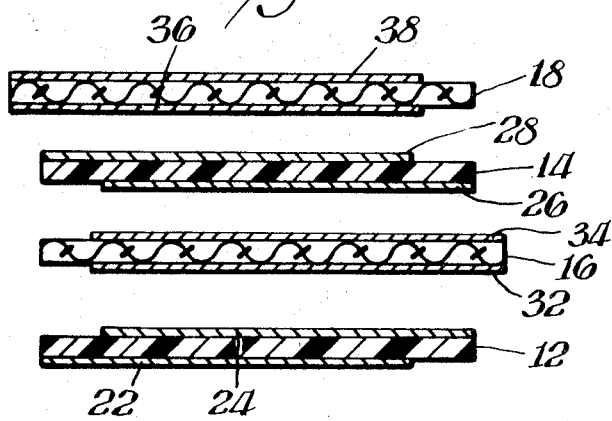
FIG. 2 is a view in section taken along line 2—2 of FIG. 1.

FIGS. 1 and 2 show a convolutely wound extended-foil capacitance section 10 constructed with a pair of doubly metallized dielectric films 12, 14 and interposed doubly metallized insulative strips 16, 18. Films 12, 14 carry conductive surface coatings 22, 24 and 26, 28, respectively; whereas strips 16, 18 carry conductive surface coatings 32, 34 and 36, 38, respectively.

Preferably, unit 10 is wound in extended-foil fashion with strips 16, 18 and their respective surface coatings extended at opposite ends of section 10 where they connect to terminal leads 42 and 44, respectively. At the extended edges, the conductive coatings on the strips 16, 18 are joined in a conventional manner to their respective terminals by conductive fusible material. That is, strip 16 is extended at the section end adjoining terminal 44, and its coatings 32, 34 are connected to this terminal by conductive material 46 of, for example, sprayed zinc or lead or the like. Strip 18, on the other hand, extends at the opposite end of section 10 such that its coatings 36, 38 are connected to terminal 42 by the conductive material.

The coatings of each strip 16, 18 contact and are interconnected to one coating of each spacer film 12, 14 such that the coatings of one strip and the adjoining coatings of both spacers make up one operating electrode of the section. Hence, film coatings 24 and 26 are interconnected through coated strip 16 (and conductive material 46) to provide one electrode of one polarity, and film coatings 22, 28 contact-coated strip 18 to provide the electrode of opposite polarity.

The surface coatings of each respective insulative strip 16, 18 are of the same polarity, and hence, have coincident margins in each case at the edge of the strip opposite to its extended edge. However, since the surface coatings of a respective film 12, 14 are of opposite polarity, the coatings must be margined at least at alternate edges of the film.

Section 10 is wound similarly margined portions of dielectric films or spacers 12, 14 in contact with or abutting opposite sides of one of the insulative strips 16, 18. The margined edges of the pairs of film coatings 24, 26 and 22, 28 are spaced inward of the margin edges of coatings 32, 34 and 36, 38 on strips 16, 18, respectively, so as to force the field of each electrode into the strip margin. Hence, each electrode (for example coatings 24, 26) is terminated or in electrical connection to coatings of both sides of the strip margin such that the voltage along the edge of the electrode is directly across the strip thickness. This is believed to provide considerably reduced voltage stress of the air at the ends, and higher corona start voltages. That is, the voltage gradients at the margin edge of the electrode follow curves of comparatively large radius in the laterally extended dielectric strips and are substantially attenuated in the margin material. Hence, in contrast to conventional structures where the electrode field is extended merely on one surface of the margin with attendant high-voltage stress, the field of the structure of this invention extends on both sides of the strips which are essentially lateral extension centered on the electrode edges.

In the preferred embodiment, the margins of films 12, 14 are made wider than those of strips 16, 18 such that when the margined edges are aligned as shown, the conductive coating of the films will contact and be electrically terminated on the strip coating inwardly of its margin edge. This inward termination of the film coating can also be provided with different margin widths by, for example, shifting the dielectric edge or the like with respect to the strip edge. However, it should be understood that severe reduction of the overlap of the dielectric margin over the strip margin reduces the effective corona control of the latter in that it exposes the next adjoining strip which is of opposite polarity.

Since both dielectric spacer films are doubly coated, voltage stress can still occur at the beginning and end of the winding. Preferably, the dielectric coatings are cleared or conventionally burned away from the ends of the films at the start and end of the winding, such that uncoated film is provided both before and after the start of strips 12 and 14. Alternatively, a single double-coated film may be folded back on itself at the start of the winding so as to enclose the start of one of the insulative strips which eliminates the need for clearing at the start of the winding.

Figure 3:
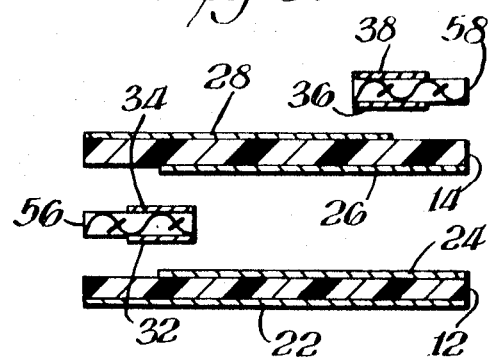
FIG. 3 is a view in section of another embodiment.

Since the insulative strips 16 and 18 are primarily to provide a laterally extended edge portion of the electrode at its margin edge, narrow insulative strips 56 and 58 may be utilized in the margin edge as shown in the FIG. 3 embodiment. Of course, terminal connection in this embodiment must be made directly to the film coatings 22, 28 and 24, 26.

Figure 4:
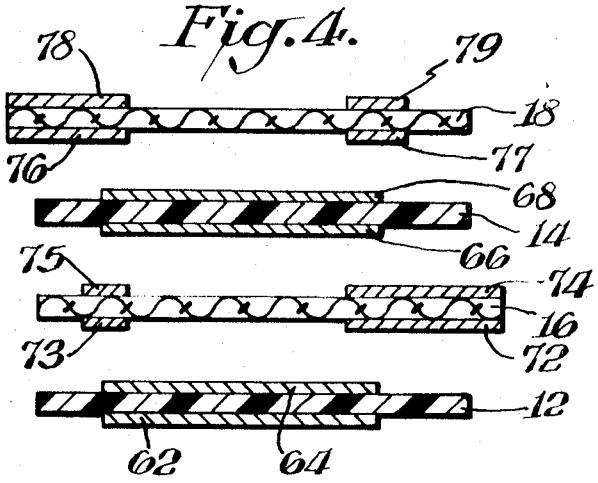
FIG. 4 is a section of a further embodiment.

In the embodiment of FIG. 4 doubly metallized dielectric films 12, 14 are margined at both ends so that metal coatings 62, 64 and 66, 68, respectively, do not extend to either edge of the films. Interposed doubly metallized insulative strips 16, 18 carry patterned conductive surface coatings 72, 73, 74, 75 and 76, 77, 78, 79, respectively. Coatings 72, 74 and 76, 78 provide the extended termination, as in the FIG. 2 embodiment; whereas coatings 73, 75 and 77, 79 provide the connective margin edge of the FIG. 3 embodiment.

Figure 5:
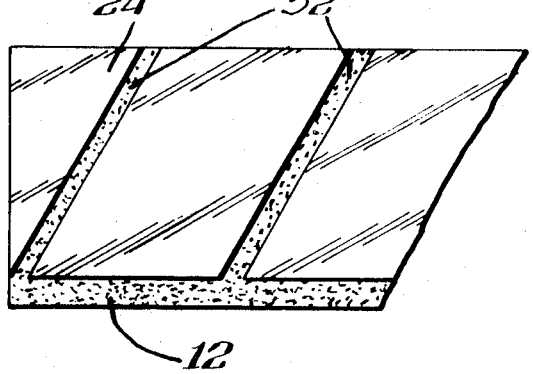
FIG. 5 is a plan view of a metallized film modification.

In a further modification that may be employed in any of the embodiments, the metallized coatings of films 12 and 14 are made longitudinally discontinuous or sectioned as, for example, by transverse cuts 52 provided along the length of coating 24 as shown in FIG. 5. In this case, the section is wound with dielectric spacer films 12, 14 initiated before the start of and continued beyond the end of insulative strips 16, 18 such that portions of the dielectric strips extend at each end of the externally connected layers 16 and 18.

Although both dielectric films carry conductive coatings they are discontinuous or isolated, in that portions not in contact with the metallized strips 16 and 18 are not charged, and hence, do not contribute to voltage stress in these areas. Consequently, spacer portions at the start and end of the winding (not in abutting contact to strips 16 or 18) operate as insulators. Of course, the coating discontinuity need only be provided at the beginning and end of the winding, however, it is more economical to provide it throughout its length.

EXAMPLE

In a specific example of the FIG. 2 embodiment, 10 units were constructed and evaluated. Each unit consisted of a pair of double-metallized dielectric films 2-1/16 inches wide and 0.25 mil thick of polyethylene terephthalate material and a pair of double-metallized insulative strips 2⅛ inches wide and 0.40 mil thick of kraft paper. Each film was metallized with zinc and included alternated margins one-eighth inch wide. Each strip was also metallized with zinc and with 3/32-inch wide margins along one edge. The film and strip pairs were convolutely wound in extended foil fashion with the metallized paper strips interposed between the films. Margins were also provided on both films at the beginning and end of the winding. The margin edge of the strips were placed in registration with the margined film edges such that the film coatings were terminated inwardly of the strip coatings, and the metallized strips were extended from alternate ends of the section. Each end of the section was sprayed with zinc and soldered to a No. 22 copper lead. These 10 units provided a corona start voltages of 450–650 v. AC.

Many different modifications are possible. For example, the metallized insulator strips may be employed only at the margin edge. Hence, the coatings in this case would be narrow stripelike portions both of which contact and interconnect to inwardly disposed electrodes to provide margins thereof.

Since the insulator strips modify and attenuate the field at the electrode edge, the material must be a good quality dielectric such as kraft paper or insulative material of higher dielectric constant.

Foil can also be employed for the electrodes, however, at least the conductive coatings of the insulative strips must be a deposited coating or otherwise in intimate bonding contact to the insulative margin strips at their margin edge so as to force the electrode field into the insulator rather than into the air at the margin edge of the coatings.

What is claimed is:

1. An electrostatic capacitor comprising a pair of dielectric films each having a conductive coating on both surfaces thereof, each of said films having an uncoated margin along diagonally alternate edges thereof, a pair of insulative strips each having conductive coatings on both surfaces thereof, both surfaces of said strips having an uncoated margin along the same edge thereof, said films being convolutely wound into a rolled section with said strips interposed between said films, the margined edge of each of said strips and a margined edge of both of said films being abuttingly aligned, the strip coatings extending into the aligned margins of said films so as to impress the electrical field across said strip at said margins.

2. The capacitor of claim 1 wherein said strips extend through and from the section ends opposite their respective margins so as to provide terminal connections.

3. The capacitor of claim 2 wherein said terminal connections include conductive coatings on both surfaces of said strips, with said conductive coatings contacting the abutting film coatings at said section ends.

4. The capacitor of claim 1 wherein said films extend beyond the beginning and end of each strip, and said coatings of said films are longitudinally discontinuous at the extended ends thereof such that said films provide an insulative winding at the beginning and end of said section.

5. The capacitor of claim 1 wherein said films are organic polymer material, and said strips are paper material.

6. The capacitor of claim 5 wherein said films are polypropylene, and said coatings are metallized coatings of aluminum.

* * * * *